United States Patent
Oda et al.

(10) Patent No.: US 9,044,880 B2
(45) Date of Patent: Jun. 2, 2015

(54) METHOD FOR PRODUCING CONTAINER

(75) Inventors: Takafumi Oda, Kanagawa (JP); Ryoji Otaki, Kanagawa (JP)

(73) Assignee: MITSUBISHI GAS CHEMICAL COMPANY, INC., Tokyo (JP)

( * ) Notice: Subject to any disclaimer, the term of this patent is extended or adjusted under 35 U.S.C. 154(b) by 465 days.

(21) Appl. No.: 13/388,523

(22) PCT Filed: Aug. 4, 2010

(86) PCT No.: PCT/JP2010/063202
§ 371 (c)(1),
(2), (4) Date: Mar. 1, 2012

(87) PCT Pub. No.: WO2011/016491
PCT Pub. Date: Feb. 10, 2011

(65) Prior Publication Data
US 2012/0146266 A1   Jun. 14, 2012

(30) Foreign Application Priority Data

Aug. 4, 2009   (JP) ................................ 2009-181868
Aug. 4, 2009   (JP) ................................ 2009-181869
Aug. 4, 2009   (JP) ................................ 2009-181871

(51) Int. Cl.
| | |
|---|---|
| *B29C 49/22* | (2006.01) |
| *B29C 49/00* | (2006.01) |
| *B65D 1/02* | (2006.01) |
| *C08L 77/06* | (2006.01) |
| *C08K 5/00* | (2006.01) |
| *B29K 77/00* | (2006.01) |

(52) U.S. Cl.
CPC .............. *B29C 49/0005* (2013.01); *B29C 49/22* (2013.01); *B65D 1/0215* (2013.01); *C08K 5/0083* (2013.01); *C08L 77/06* (2013.01); *B29K 2995/0067* (2013.01); *B29K 2995/0041* (2013.01); *B29K 2995/0069* (2013.01); *B29K 2077/00* (2013.01)

(58) Field of Classification Search
CPC .... B29C 49/0005; B29C 49/22; B29C 49/64; B29C 49/6409; B29C 49/6427
USPC ......... 264/512, 572, 519, 234, 235, 237, 345, 264/40.6
See application file for complete search history.

(56) References Cited

U.S. PATENT DOCUMENTS

| | | | |
|---|---|---|---|
| 4,517,151 A | | 5/1985 | Masumoto et al. |
| 5,411,698 A | * | 5/1995 | Mero et al. ..................... 264/521 |
| 6,746,643 B1 | | 6/2004 | Kannari |
| 2002/0040087 A1 | * | 4/2002 | Yamamoto et al. ........... 524/451 |
| 2003/0054161 A1 | * | 3/2003 | Forte et al. ..................... 428/332 |
| 2004/0076781 A1 | * | 4/2004 | Kanda et al. ................. 428/35.7 |
| 2010/0004406 A1 | | 1/2010 | Sato |
| 2010/0180979 A1 | | 7/2010 | Mitadera et al. |

FOREIGN PATENT DOCUMENTS

| | | |
|---|---|---|
| EP | 1 810 988 A1 | 7/2007 |
| JP | 57 212031 | 12/1982 |
| JP | 58 96527 | 6/1983 |
| JP | 2001 88200 | 4/2001 |
| JP | 2006-45528 A | 2/2006 |
| WO | 2007 086331 | 8/2007 |
| WO | 2008 050793 | 5/2008 |

OTHER PUBLICATIONS

Extended European Search Report issued Feb. 15, 2013 in European Patent Application No. 10806490.8.
International Search Report Issued Nov. 16, 2010 in PCT/JP10/63202 Filed Aug. 4, 2010.

* cited by examiner

*Primary Examiner* — Timothy Kennedy
(74) *Attorney, Agent, or Firm* — Oblon, McClelland, Maier & Neustadt, L.L.P.

(57) ABSTRACT

Provided is a production method for a container, including the steps of: inflating a material in a mold by direct blowing, the material including a polyamide resin composition containing 0.01 to 2 parts by mass of a crystallization promoter and 100 parts by mass of a polyamide resin obtained by polycondensation of a diamine component containing 70 mol % or more of m-xylylenediamine and a dicarboxylic acid component including an α,ω-linear aliphatic dicarboxylic acid having 4 to 12 carbon atoms and an aromatic dicarboxylic acid at a molar ratio of 97:3 to 90:10; and retaining the material in the mold whose temperature is controlled to 0 to 60° C., for a time beginning immediately after the direct blowing and lasting for 30% or more of a semi-crystallization time at cooling of the polyamide resin composition under a constant temperature of 160° C.

18 Claims, No Drawings

METHOD FOR PRODUCING CONTAINER

TECHNICAL FIELD

The present invention relates to a production method for a container, and more specifically, to a production method for a container formed of a material comprising a polyamide resin composition obtained by polycondensation of m-xylylenediamine and an aliphatic dicarboxylic acid and an aromatic dicarboxylic acid.

BACKGROUND ART

A polyamide resin has an excellent mechanical performance and hence is widely used as a material for injection-molded products such as automobile and electrical and electronic parts. Further, the polyamide resin is used as a packaging material for foods, drinks, drugs, electronic parts, and the like. Of those, a polyamide (MX nylon) obtained by a polycondensation reaction between a xylylenediamine and an aliphatic dicarboxylic acid, in particular, a polyamide (polyamide MXD6) obtained from m-xylylenediamine and adipic acid has low permeability to a gaseous substance such as oxygen or carbon dioxide, and hence is used as a gas-barrier material in a molded product such as a film or a bottle.

In recent years, as a container for storing a fuel, a resin container for a fuel formed by direct blow molding or the like has attracted attention from the viewpoints of, for example, reducing the weight, requiring no antirust treatment, improving a degree of shape freedom, reducing the number of steps for processing, and automatizing production, and the container has been gradually substituted for a metal container for a fuel. However, a polyolefin (in particular, high-density polyethylene) used in the resin container for a fuel is excellent in mechanical strength, molding processability, and economic efficiency but has poor barrier performance against a fuel (hereinafter, also referred to as "fuel barrier property"), and hence is difficult to meet the regulation of a fuel permeation amount.

Therefore, there have been proposed, for example, a method involving performing a fluorine treatment inside a container and a multilayer container including a fuel barrier layer, which is formed of a polyamide resin, an ethylene-vinyl alcohol copolymer, or the like having fuel barrier property, as an intermediate layer between polyethylene layers (see Patent Documents 1 to 5, for example). Of those, the fluorine treatment is now less used because it is difficult to ensure safety in handling of a hazardous gas and to collect the gas after the treatment, for example. In the case of the multilayer container, the fuel permeation amount can be decreased to a certain degree by providing the fuel barrier layer, but the barrier property against a fuel is still imperfect. When the thickness of the fuel barrier layer is increased, problems such as a decrease in impact absorption at the time of impact, an increase in weight, and an increase in cost may be caused, and hence it has been difficult for the multilayer container to sufficiently meet regulations to be more tightened in the future.

Moreover, addition of ethanol or the like to gasoline can decrease the amount of a fossil fuel to be used, resulting in reducing the amount of carbon dioxide emissions. Therefore, a study on use of ethanol as a fuel has been made, but nylon 6 and an ethylene-vinyl alcohol copolymer is inferior in barrier property against an alcohol. Accordingly, a material having enhanced barrier property against a fuel containing an alcohol has been required.

Meanwhile, a container for applications such as a fuel is usually molded by a direct blowing method, but the above-mentioned conventional fuel barrier material is inferior in heat resistance and tends to cause gelation by an increase in the temperature of a resin or accumulation of a resin, which restricts conditions in production. In addition, it is necessary to recycle burrs generated in molding and to switch the resin to a resin excellent in heat stability in operating or stopping an apparatus, and there are problems in productivity and efficient use of the material. In particular, if the resin has a low melt viscosity, the direct blowing method causes drawdown to excessively decrease the thickness of the resultant product or defects such as uneven thickness. Further, when the molding temperature is too high, the melt viscosity of a polyolefin used in the outer layer is lowered to cause drawdown, which is not preferred.

In a multilayer fuel container obtained by molding a material including a polyamide resin having fuel barrier property as an intermediate layer by the direct blowing method, there is a problem in that a fuel barrier material is not fed in a pinch-off site generated during molding, and a fuel permeates from the pinch-off site, resulting in lowering the fuel barrier property. Therefore, recently, a multilayer fuel container including a polyamide resin in an inner layer and a fuel container formed of a blend of a polyamide resin with a polyolefin have been developed. In such fuel containers, the polyamide resin having fuel barrier property is contact with a fuel, and hence the fuel barrier property can be maintained to a high level.

In addition, Patent Document 6 describes a polyamide resin obtained by copolymerization of m-xylylenediamine with an aliphatic dicarboxylic acid and a naphthalenedicarboxylic acid, and describes that the polyamide resin is excellent in fuel barrier property.

Further, Patent Document 7 describes that a polyamide resin excellent in fuel barrier property, in particular, alcohol barrier property can be obtained by maintaining a polymer obtained by copolymerization of m-xylylenediamine with an aliphatic dicarboxylic acid and isophthalic acid in the presence of 1 to 30 wt % of water at 70 to 120° C. for 0.5 to 4 hours to crystallize the polymer and performing a heat treatment in an inert gas atmosphere or the like at a temperature of (the melting point of the polymer −50° C.) to (the melting point of the polymer −10° C.) for 1 to 12 hours.

CITATION LIST

Patent Literature

[Patent Documents 1] JP 03-32815 A
[Patent Documents 2] JP 05-345349 A
[Patent Documents 3] JP 06-340033 A
[Patent Documents 4] JP 09-29904 A
[Patent Documents 5] JP 2001-97053 A
[Patent Documents 6] JP 2005-314487 A
[Patent Documents 7] JP 2006-45528 A

SUMMARY OF INVENTION

Technical Problem

However, it was found that the polyamide resin described in Patent Document 6 had high fuel barrier property but had insufficient ethanol resistance because the polyamide resin had an excessively low crystallization degree due to a high copolymerization ratio of the naphthalenedicarboxylic acid. That is, it was found that one reason why the ethanol resistance of the polyamide resin was not improved was the low crystallization degree of the polyamide resin.

Moreover, as mentioned above, the container is usually molded by the direct blowing method, and in the case of producing a container by the direct blowing method, from the viewpoint of productivity, the mold is opened to take out the container as soon as a resin or the like in contact with the mold is hardened.

Therefore, it is considered that the crystallization degree of the polyamide resin is improved by retaining a polyamide resin obtained by copolymerization of m-xylylenediamine with an aliphatic dicarboxylic acid and a naphthalenedicarboxylic acid in a mold in a direct blow molding apparatus for a long period of time. However, a method involving retaining the polyamide resin subjected to direct blowing in the mold for a long period of time in order to increase the crystallization degree lowers productivity and hence cannot be employed in actual production.

Further, even if the crystallized polyamide resin described in Patent Document 7 is used as a material, in the case of producing a container by the direct blowing method, it is necessary to decrease the viscosity of the polyamide resin so that the resin can be molded, which may decrease the crystallization degree of the polyamide resin during blow molding, resulting in lowering the ethanol resistance and fuel barrier property of the resultant container.

A problem to be solved by the present invention is to provide an efficient production method for a container excellent in ethanol resistance and fuel barrier property using a polyamide resin obtained by copolymerization of m-xylylenediamine and an aliphatic dicarboxylic acid and an aromatic dicarboxylic acid.

Solution to Problem

The present invention provides the following production method for a container.

(1) A production method for a container, comprising the steps of:

inflating a material in a mold by direct blowing, the material comprising a polyamide resin composition containing 0.01 to 2 parts by mass of a crystallization promoter and 100 parts by mass of a polyamide resin obtained by polycondensation of a diamine component comprising 70 mol % or more of m-xylylenediamine and a dicarboxylic acid component including an $\alpha,\omega$-linear aliphatic dicarboxylic acid having 4 to 12 carbon atoms and an aromatic dicarboxylic acid at a molar ratio of 97:3 to 90:10; and retaining the material in the mold whose temperature is controlled to 0 to 60° C., for a time beginning immediately after the direct blowing and lasting for 30% or more of a semi-crystallization time at cooling of the polyamide resin composition under a constant temperature of 160° C.

(2) The production method for a container according to the above-mentioned item (1), wherein the aromatic dicarboxylic acid is one or more kinds selected from the group consisting of isophthalic acid, terephthalic acid, and 2,6-naphthalenedicarboxylic acid.

(3) The production method for a container according to the above-mentioned item (1) or (2), wherein a peak temperature due to crystallization during heating in differential scanning calorimetry of the polyamide resin composition is 160° C. or less.

(4) The production method for a container according to any one of the above-mentioned items (1) to (3), wherein the container is a multilayer container; and the direct blowing of the material comprising the polyamide resin composition is carried out so that at least one layer in the multilayer container is a layer formed of the material comprising the polyamide resin composition.

(5) The production method for a container according to the above-mentioned item (4), wherein at least one layer other than the layer formed of the material comprising the polyamide resin composition in the multilayer container is a layer formed of a material comprising a polyolefin resin.

(6) The production method for a container according to the above-mentioned item (4) or (5), wherein the direct blowing of the material comprising the polyamide resin composition is carried out so that the layer formed of the material comprising the polyamide resin composition is arranged in an inner surface of the container.

Advantageous Effects of Invention

According to the present invention, it is possible to efficiently produce the container excellent in ethanol resistance and fuel barrier property by increasing the crystallization degree of a polyamide resin obtained by copolymerization of m-xylylenediamine and an aliphatic dicarboxylic acid and an aromatic dicarboxylic acid.

DESCRIPTION OF EMBODIMENTS

The present invention is a production method for a container, comprising the steps of: inflating a material in a mold by direct blowing, the material comprising a polyamide resin composition containing 0.01 to 2 parts by mass of a crystallization promoter and 100 parts by mass of a polyamide resin obtained by polycondensation of a diamine component comprising 70 mol % or more of m-xylylenediamine and a dicarboxylic acid component including an am-linear aliphatic dicarboxylic acid having 4 to 12 carbon atoms and an aromatic dicarboxylic acid at a molar ratio of 97:3 to 90:10; and retaining the material in the mold whose temperature is controlled to 0 to 60° C., for a time beginning immediately after the direct blowing and lasting for 30% or more of a semi-crystallization time at cooling of the polyamide resin composition under a constant temperature of 160° C.

The inventors of the present invention have found that a container excellent in ethanol resistance and fuel barrier property can be produced efficiently by decreasing the content of an aromatic dicarboxylic acid in dicarboxylic acids and retaining a material comprising a polyamide resin composition including a crystallization promoter in a mold whose temperature is controlled to 0 to 60° C., for a time beginning immediately after direct blowing and lasting for at least 30% of the semi-crystallization time at cooling of the polyamide resin composition under a constant temperature of 160° C. The present invention has been completed based on such finding.

The polyamide resin used in the present invention can be obtained by polycondensation of a diamine component comprising 70 mol % or more of m-xylylenediamine and a dicarboxylic acid component including an $\alpha,\omega$-linear aliphatic dicarboxylic acid having 4 to 12 carbon atoms and an aromatic dicarboxylic acid at a molar ratio of 97:3 to 90:10.

In the present invention, m-xylylenediamine is used as the diamine component, but other diamine components can also be used. For example, p-xylylenediamine, p-phenylenediamine, 1,3-bis(aminomethyl)cyclohexane, 1,4-bis(aminomethyl)cyclohexane, tetramethylenediamine, pentamethylenediamine, octamethylenediamine, and nonamethylenediamine can be used.

From the viewpoint of fuel barrier property, the content of m-xylylenediamine in the diamine component is 70 mol % or more, preferably 75 mol % or more, more preferably 85 mol % or more, still more preferably 90 mol % or more, and its upper limit is 100 mol %.

In the present invention, the $\alpha,\omega$-linear aliphatic dicarboxylic acid having 4 to 12 carbon atoms and the aromatic dicarboxylic acid as a component for enhancing ethanol resistance are used as the dicarboxylic acid component.

Examples of the $\alpha,\omega$-linear aliphatic dicarboxylic acid having 4 to 12 carbon atoms include aliphatic dicarboxylic acids such as succinic acid, glutaric acid, pimelic acid, suberic acid, azelaic acid, adipic acid, sebacic acid, undecanedioic acid, and dodecanedioic acid. Of those, adipic acid is preferred.

Examples of the aromatic dicarboxylic acid include isophthalic acid, terephthalic acid, a naphthalenedicarboxylic acid, and a biphenyldicarboxylic acid. As the naphthalenedicarboxylic acid, there can be used isomers such as 1,2-naphthalenedicarboxylic acid, 1,3-naphthalenedicarboxylic acid, 1,4-naphthalenedicarboxylic acid, 1,5-naphthalenedicarboxylic acid, 1,6-naphthalenedicarboxylic acid, 1,7-naphthalenedicarboxylic acid, 1,8-naphthalenedicarboxylic acid, 2,3-naphthalenedicarboxylic acid, and 2,7-naphthalenedicarboxylic acid. Those naphthalenedicarboxylic acids may be copolymerized.

Particularly from the viewpoint of enhancing fuel barrier property, it is preferred that a diamine having an aromatic ring and a dicarboxylic acid having an aromatic ring be copolymerized in large amounts.

In the present invention, the aromatic dicarboxylic acid is preferably one or more kinds selected from the group consisting of isophthalic acid, terephthalic acid, and 2,6-naphthalenedicarboxylic acid.

In the formation of the polyamide resin, no particular limitation is imposed on the incorporation of any other polyamide-forming component than those described above. Examples of such polyamide-forming component include lactams such as caprolactam, valerolactam, laurolactam, and undecalactam and aminocarboxylic acids such as 11-aminoundecanoic acid and 12-aminododecanoic acid.

In general, when a component such as the aromatic dicarboxylic acid is added to the m-xylylenediamine and $\alpha,\omega$-linear aliphatic dicarboxylic acid having 4 to 12 carbon atoms to perform copolymerization, the resultant polyamide resin tends to de-crystallize. If the polyamide resin de-crystallizes, the resin has deteriorated ethanol resistance and hence should maintain a certain level of crystallization degree.

In the present invention, from the viewpoint of maintaining the crystallization degree of the polyamide resin, the content of the aromatic dicarboxylic acid is lowered, and the molar ratio of the $\alpha,\omega$-linear aliphatic dicarboxylic acid having 4 to 12 carbon atoms to the aromatic dicarboxylic acid (($\alpha,\omega$-linear aliphatic dicarboxylic acid):(aromatic dicarboxylic acid)) is 97:3 to 90:10 from the viewpoint of the ethanol resistance and fuel barrier property. If the content of the aromatic dicarboxylic acid is lower than that in the molar ratio, a polyamide resin excellent in fuel barrier property is difficult to produce, while if the content of the aromatic dicarboxylic acid is higher than that in the molar ratio, a polyamide resin excellent in ethanol resistance is difficult to produce because the crystallization degree of the polyamide resin is lowered.

As a production method for the polyamide resin, a method involving adding a phosphorus atom-containing compound to perform melt polycondensation (melt polymerization) is preferred, and the phosphorus atom-containing compound is preferably added during melt polycondensation. For example, when polycondensation is performed up to the polymerization degree of a resin which can be used as a material for a container, heat history may increase to cause gelation or coloring of the polyamide resin. On the other hand, when the phosphorus atom-containing compound is allowed to exist in a system during melt polycondensation, it is possible to prevent coloring of the resultant polyamide in yellow and to prevent lowering of an amidation reaction rate.

As a melt polycondensation method, there is given a method involving, for example, heating a nylon salt formed of a diamine component and a dicarboxylic acid component in the presence of the phosphorus atom-containing compound under increased pressure in the presence of water, and performing polymerization in a molten state while removing the added water and condensation water. In addition, there is also given a method involving directly adding a diamine component to a dicarboxylic acid component in a molten state to perform polycondensation. In this case, polycondensation is preferably progressed by continuously adding the diamine component to the dicarboxylic acid component to maintain the reaction system in a homogeneous liquid state while the reaction system is heated so that the reaction temperature does not become lower than the melting points of the oligoamide and polyamide produced.

The phosphorus atom-containing compound to be added in the polycondensation system of the polyamide resin of the present invention is not particularly limited, and examples thereof include dimethylphosphinic acid, phenylmethylphosphinic acid, hypophosphorous acid, sodium hypophosphite, potassium hypophosphite, lithium hypophosphite, ethyl hypophosphite, phenylphosphonous acid, sodium phenylphosphonite, potassium phenylphosphonite, lithium phenylphosphonite, ethyl phenylphosphonite, phenylphosphonic acid, ethylphosphonic acid, sodium phenylphosphonate, potassium phenylphosphonate, lithium phenylphosphonate, diethyl phenylphosphonate, sodium ethylphosphonate, potassium ethylphosphonate, phosphorous acid, sodium hydrogen phosphite, sodium phosphite, triethyl phosphite, triphenyl phosphite, and pyrophosphorous acid. Of those, hypophosphorous acid metal salts such as sodium hypophosphite, potassium hypophosphite, and lithium hypophosphite are preferably used because they have particularly high effects of promoting an amidation reaction and are also excellent in anti-coloring effect, and sodium hypophosphite is particularly preferred.

The amount of the phosphorus atom-containing compound to be added in a polycondensation system for the polyamide resin of the present invention is preferably 50 to 400 ppm by mass, more preferably 60 to 350 ppm by mass, still more preferably 70 to 300 ppm by mass in terms of the concentration of a phosphorus atom in the polyamide resin.

Further, an alkali metal compound is preferably added to the polycondensation system for the polyamide rein together with the phosphorus atom-containing compound. In order to prevent coloring of the polyamide during polycondensation, a sufficient amount of the phosphorus atom-containing compound should be present. However, in some cases, the compound may induce gelation of the polyamide, and hence the alkali metal compound is preferably added to adjust an amidation reaction rate. The alkali metal compound is preferably an alkali metal hydroxide or an alkali metal acetate. Examples of the alkali metal hydroxide include lithium hydroxide, sodium hydroxide, potassium hydroxide, rubidium hydroxide, and cesium hydroxide, and examples of the alkali metal acetate include lithium acetate, sodium acetate, potassium acetate, rubidium acetate, and cesium acetate. However, other hydroxides and acetates can be used without being limited to the compounds described above.

The polyamide resin obtained by melt polycondensation as described above is taken out once, pelletized, and dried. Further, in order to increase the polymerization degree, the polyamide resin may be subjected to solid-phase polymerization. As a heating apparatus used in drying or solid polymerization, a continuous heat-drying apparatus, a rotary drum heating apparatus called tumble drier, conical drier, or rotary drier, and a conical heating apparatus internally equipped with a rotating blade, called Nauta mixer, are suitably used. However, the apparatus is not limited thereto, and known methods and apparatuses may be used. In particular, in the case of performing solid-phase polymerization of the polyamide resin, of the above-mentioned apparatuses, a batch heating apparatus which can seal a system and perform polycondensation easily in a state in which an oxygen which may cause coloring has been removed is preferably used.

The polyamide resin obtained through the above-mentioned melt polycondensation step and the like is less colored and includes only a small amount of gel. In the present invention, from the viewpoint of coloring of a molded product, a polyamide resin having a "b*" value, which is determined by the color difference test in accordance with JIS-K-7105, of preferably 3 or less, more preferably 2 or less, still more preferably 1 or less is used.

In order to adjust the "b*" value to 3 or less, for example, a phosphorus atom-containing compound may be added to a polycondensation system of the polyamide resin in an amount of 50 to 400 ppm by mass in terms of the concentration of a phosphorus atom in the polyamide resin, resulting in suppression of a decrease in the "b*" value. In addition, a stirring blade having an appropriate shape may be used to avoid localized heat transfer to the polyamide during the melt polymerization step.

The polyamide resin composition used in the present invention contains the above-mentioned polyamide resin and a crystallization promoter from the viewpoint of increasing the crystallization degree of the polyamide resin and improving ethanol resistance and fuel barrier property of the polyamide resin.

The crystallization promoter used in the present invention may be an inorganic or organic crystallization promoter. Two or more kinds of crystallization promoters may be used in combination.

Examples of the inorganic crystallization promoter include glass fillers (such as glass fiber, milled glass fiber (milled fiber), glass flake, and glass beads), calcium silicate-based fillers (such as wollastonite), mica, talc (such as powdered talc and granulated talc using rosin as a binder), kaolin, potassium titanate whisker, boron nitride, clay such as a layered silicate, a nanofiller, and carbon fiber. The inorganic crystallization promoter preferably has a maximum diameter of 0.01 to 5 μm. In particular, the inorganic crystallization promoter is preferably powdered talc having a particle diameter of 3.0 μm or less, more preferably powdered talc having a particle diameter of about 1.5 to 3.0 μm, particularly preferably powdered talc having a particle diameter of 2.0 μm or less. In addition, granulated talc using the powdered talc with rosin as a binder is particularly preferred because it shows a satisfactory dispersion state in the polyamide resin.

Further, the organic crystallization promoter may be one usually used for a thermoplastic resin, and examples thereof include: a capsule formed of a bimolecular membrane obtained by adding a nucleating agent component or the like in a microsized or nanosized capsule formed of a bimolecular membrane; a benzylidene sorbitol-based or phosphorus-based transparency crystallization nucleating agent; and a rosin amide-based gelator. In particular, a bis(benzylidene) sorbitol-based crystallization nucleating agent is preferred.

The crystallization promoter content is 0.01 to 2 parts by mass with respect to 100 parts by mass of the polyamide resin. If the content is less than 0.01 parts by mass, the effect of the incorporation of the crystallization promoter is small, while even if the content exceeds 2 parts by mass, the effect of increasing the crystallization degree of the polyamide resin is not increased, and a melt viscosity in molding is decreased or transparency of a molded product is deteriorated depending on the type of the crystallization nucleating agent, which is not preferred. The content is particularly preferably 0.1 to 1 parts by mass.

In the present invention, when the above-mentioned crystallization promoter is used, it is possible to control the crystallization degree, which is calculated from equation (1) below using an exothermic peak (heat quantity A) attributed to crystallization in a differential scanning calorimetry and an endothermic peak (heat quantity B) attributed to melting, to 5% or more, and the polyamide resin composition is excellent in ethanol resistance and fuel barrier property.

$$\text{Crystallization degree} = ((\text{heat quantity } B) - (\text{heat quantity } A))/\text{heat quantity } C \times 100(\%) \quad (1)$$

Here, the heat quantity C is a crystal melting heat, and the value is 151 J/g. Meanwhile, the heat quantities are represented as absolute values.

The polyamide resin composition used in the present invention has a peak temperature (crystallization peak temperature) attributed to crystallization during heating in a differential scanning calorimetry of preferably 160° C. or less, more preferably 140 to 160° C. A low peak temperature attributed to crystallization during heating means that the resultant product is crystalline and is obtained at a high crystallization rate, and if the temperature is 160° C. or less, a crystallization degree enough to exert ethanol resistance can be maintained. If the crystallization rate is high, productivity is not impaired because a retention time in a mold can be shortened in the case of using the polyamide resin composition of the present invention as a molded product such as a direct blow bottle.

The crystallization promoter may be incorporated into the polyamide resin by, for example, blending the crystallization promoter in the polyamide resin, and extruding the mixture using an extruder to produce a polyamide resin composition (film) in which the crystallization promoter is dispersed uniformly in the polyamide resin.

The polyamide resin composition to be used in the present invention may contain, for example, additives such as a delusterant, a thermal stabilizer, a weathering stabilizer, a UV absorbent, a plasticizer, a flame retardant, an antistatic, an anti-coloring agent, and an anti-gelling agent as required within such a range that the effects of the present invention are not impaired.

As an index of moldability of the polyamide resin composition used in the present invention, the polymerization degree of the polymer is given, and a method of measuring a relative viscosity is used as means for determining the polymerization degree of the polymer.

The polyamide resin composition used in the present invention has a relative viscosity of preferably 1.5 to 4.2, more preferably 1.7 to 4.0, still more preferably 2.0 to 3.8 from the viewpoint of molding processability.

It should be noted that the relative viscosity as used herein is a ratio of a falling time (t) of a solution obtained by dissolving 0.2 g of the polyamide resin in 100 ml of 96% sulfuric acid, measured using a Cannon-Fenske viscometer at 25° C., to a falling time (t0) of 96% sulfuric acid itself measured in the same, and is calculated by equation (2) below.

$$\text{Relative viscosity} = t/t0 \quad (2)$$

In the polyamide resin composition to be used in the present invention, the above-mentioned specific polyamide resin may be blended with any other polyamide resin. Examples of such other polyamide resin include polyamide 4, polyamide 6, polyamide 10, polyamide 11, polyamide 12, polyamide 4,6, polyamide 6,6, polyamide 6,10, polyamide 6IT (polyhexamethylene isophthalamide/polyhexamethylene terephthalamide copolymer), polyamide 6I (polyhexamethylene isophthalamide), polyamide 6T (polyhexamethylene terephthalamide), polyamide 9T (polynonamethylene terephthalamide), polyamide MXD6 (poly-m-xylylene adipamide), polyamide 1,3-BAC6 (poly(cyclohexane-1,3-dimethylene) adipamide), polyamide 1,4-BAC6 (poly(cyclohexane-1,4-dimethylene) adipamide), polyamide MXD10 (poly-m-xylylene sebacamide), polyamide PXD10 (poly-p-xylylene sebacamide), and polyamide MP6 (poly-m-xylylene adipamide/poly-p-xylylene adipamide copolymer).

When any of those polyamides is blended with the specific polyamide resin described above, it is possible to adjust the melt viscosity and to avoid a molding defect such as uneven thickness due to drawdown or the like.

In addition, as the material used for producing the container in the present invention, the polyamide resin composition may be used as a mixture with a thermoplastic resin such as a polyolefin resin, a polystyrene resin, a polyester resin, or a polycarbonate resin. Examples of the polyolefin resin include a linear low-density polyethylene resin, a low-density polyethylene resin, a medium-density polyethylene resin, a high-density polyethylene resin, an ultra-high-molecular-weight high-density polyethylene resin, a polypropylene resin, and a resin formed of a copolymer of two or more kinds of olefins selected from ethylene, propylene, butene, and the like, and mixtures thereof.

In addition, in the case where the polyamide resin composition is mixed with the thermoplastic resin, an adhesive resin or an olefin- and/or styrene-based copolymer modified with an unsaturated carboxylic acid or an anhydride thereof is preferably used as a compatibilizing agent. Further, the viscosity and addition amount of the polyamide resin or thermoplastic resin is desirably adjusted to provide a dispersion state in which such a continuous layer is formed that the polyamide resin content is continuously changed. A mixing method may be any known method, and examples thereof include, but are not limited to, a method involving dry-blending resin pellets with each other and dispersing the mixture using an extruder, a method involving mixing resin powders and dispersing the mixture using an extruder, and a method involving dispersing resins using a mixer.

According to the production method of the present invention, it is possible to produce a monolayer container formed of a material comprising the above-mentioned polyamide resin composition and a multilayer container having a layer formed of a material comprising the above-mentioned polyamide resin composition and a layer formed of a material comprising another thermoplastic resin.

In the case of producing the multilayer container, examples of the thermoplastic resin used in a layer other than the layer formed of the material comprising the above-mentioned polyamide resin composition include: the thermoplastic resin exemplified above such as a polyolefin resin, a polystyrene resin, a polyester resin, a polycarbonate resin, and a polyamide resin; and the other polyamide resin exemplified above.

Of the thermoplastic resins, an ultra-high-molecular-weight high-density polyethylene resin is preferably used because the resin is excellent in drawdown prevention in hollow molding, impact resistance, fuel swelling resistance, and water resistance. Further, the above-mentioned thermoplastic resins may be mixed with each other, or mixed with another resin such as an elastomer, and for example, the resins may be mixed with another additive such as carbon black or a flame retardant.

The method of the present invention comprises the step of inflating a material comprising the above-mentioned polyamide resin composition in a mold by direct blowing. Specifically, in the step, it is preferred that a cylindrical parison formed of a material comprising the above-mentioned polyamide resin composition be formed using an extruder, and the parison be extruded into a tube shape and held with a mold, followed by blowing with high-pressure air or the like to inflate and mold the parison into a container having, for example, a bottle, tube, or tank shape.

In the case of producing the multilayer container, the material is preferably molded, using a cylindrical die, into a multilayer container having, for example, a bottle, tube, or tank shape in which a fuel barrier layer formed of a material comprising the above-mentioned polyamide resin composition and a thermoplastic resin layer formed of a polyolefin resin or the like are laminated.

Further, the method of the present invention includes, in production of a container using a material comprising the above-mentioned polyamide resin composition by a direct blowing method, the step of retaining the above-mentioned material in the above-mentioned mold, which has been adjusted to a temperature of 0° C. to 60° C., for a time beginning immediately after the direct blowing and lasting for 30% or more of the semi-crystallization time at cooling of the polyamide resin composition at a constant temperature of 160° C. The use of the above-mentioned crystallization promoter and the retention step can increase the crystallization degree of the polyamide resin in a short time to suppress contraction of the container or the like to the minimum and to produce a container excellent in ethanol resistance and fuel barrier property.

The temperature in the mold is adjusted to 0 to 60° C., preferably 10 to 50° C., more preferably 20 to 40° C. from the viewpoint of efficient cooling of the material comprising the polyamide resin composition within an appropriate range so as to reduce poor appearance in molding or contraction of a molded product, and increasing the crystallization degree up to a level enough for excellent ethanol resistance and fuel barrier property.

Further, the retention time in the mold is 30% or more, preferably 33% or more, more preferably 35% or more of the semi-crystallization time at cooling of the above-mentioned polyamide resin composition at a constant temperature of 160° C. from the viewpoint of increasing the crystallization degree up to a level enough for excellent ethanol resistance and fuel barrier property of the material comprising the polyamide resin composition. The upper limit of the retention time in the mold is appropriately determined in consideration of the type of the material and thickness of a container, and in view of productivity, the retention time is 1,000% or less, preferably 500% or less, more preferably 300% or less of the semi-crystallization time at cooling of the above-mentioned polyamide resin composition at a constant temperature of 160° C.

Here, the semi-crystallization time at cooling represents a time until a half of crystallization proceeds when a pellet or a film formed of the above-mentioned polyamide resin composition is melted in a hot air environment at 260° C. for 3 minutes by a depolarized light intensity method and then crystallized in a 160° C. oil bath. It can be said that, as the semi-crystallization time is shorter, the crystallization rate of the material is higher. The reason that crystallization is performed at 160° C. is that the crystallization rate of the above-mentioned polyamide resin composition is the highest at the temperature, and measurement can be easily performed.

The thickness of each layer in the container produced according to the present invention varies depending on the shape of a multilayer molded product, and usually, the thickness of the fuel barrier layer is selected from the range of 0.001 to 1 mm, while the thickness of the thermoplastic resin layer is selected from the range of 0.01 to 20 mm.

In the present invention, an adhesive resin layer (adhesive layer) may be provided between layers for constructing a multilayer molded product, for example, between a fuel barrier layer and a thermoplastic resin layer. For example, in the case of bonding a thermoplastic resin layer formed of a polyolefin, a copolymer of polyethylene, polypropylene, or an olefin such as ethylene, propylene, or butene, which is modified with maleic acid, acrylic acid, methacrylic acid, itaconic acid, or an acid anhydride thereof, may be used as an adhesive resin for constructing the layer. In addition, in the case where the thermoplastic resin layer is formed of polyester or polycarbonate, examples thereof include, but are not limited to, an ethylene-vinyl acetate-based copolymer, a crosslinked product of an ethylene-acrylic acid-based copolymer with an alkali or alkaline-earth metal, and an ethylene-acrylic acid ester-based copolymer.

In the present invention, burrs and defective products in molding may be melted again, and introduced into a multilayer molded product as a recycle layer. In this case, from the viewpoint of strength, the recycle layer is suitably arranged outside of the fuel barrier layer.

Examples of the construction of the multilayer container using the above-mentioned polyamide resin composition include, but are not limited to: a construction of three kinds of five layers formed of for example, from the outside layer, a high-density polyethylene resin layer/an adhesive layer/the above-mentioned polyamide resin composition layer/the adhesive layer/the high-density polyethylene resin layer; a construction of four kinds of seven layers formed of, for example, from the outside layer, the high-density polyethylene resin layer/a recycle layer/the adhesive layer/the above-mentioned polyamide resin composition layer/the adhesive layer/the recycle layer/the high-density polyethylene resin composition layer; and a construction of three kinds of three layers formed of, for example, from the outside layer, the high-density polyethylene resin composition layer/the adhesive layer/the above-mentioned polyamide resin composition layer, in which the polyamide resin composition is brought into contact with a fuel. It should be noted that the construction of three kinds of three layers includes the above-mentioned polyamide resin composition as an inner layer, and hence good fuel barrier property can be maintained without cutting the polyamide resin composition layer at a pinch-off site.

It should be noted that, in the case of using a mixed resin composition comprising the above-mentioned polyamide resin composition and a polyolefin resin, the polyamide resin composition of the present invention in the polyolefin is preferably dispersed in a layer state compared with an island state for achieving good fuel barrier property. Further, a container formed of the mixed resin composition may have a monolayer or a multilayer, and in the case of the multilayer, a layer formed of the mixed resin composition may be used as any layer, but is most preferably used as an intermediate layer.

EXAMPLES

Hereinafter, the present invention is specifically described by way of examples and comparative examples. It should be noted that measurement for evaluations in the present invention was performed in accordance with the following methods.

(1) Relative Viscosity of Polyamide Resin 0.2 g of a polyamide resin was weighed accurately and dissolved in 100 ml of 96% sulfuric acid with stirring at 20 to 30° C. Immediately after the resin was dissolved completely, 5 ml of the solution were taken to a Cannon-Fenske viscometer and allowed to stand for 10 minutes in a thermostat at 25° C., followed by measurement of a falling time (t). Further, the falling time of 96% sulfuric acid itself (t0) was measured in the same manner as above. Then, a relative viscosity was calculated from t and t0 by equation (2) below.

$$\text{Relative viscosity} = t/t0 \qquad (2)$$

(2) Reaction Molar Ratio of Polyamide Resin

A reaction molar ratio of the polyamide resin was calculated as follows. First, the polyamide resin was dissolved separately in a mixed solvent of phenol/ethanol and a benzyl alcohol solvent, and neutralization titration was performed with an aqueous hydrochloric acid solution and an aqueous sodium hydroxide solution to determine the concentration of carboxyl terminal groups and the concentration of amino terminal groups. Next, the reaction molar ratio was calculated from the concentration of terminal amino groups and the concentration of terminal carboxyl groups by equation (3) below.

$$\text{Reaction molar ratio} = (1 - 18.015 \times \text{concentration of terminal amino group} - 73.07 \times A)/(1 - 18.015 \times \text{concentration of terminal carboxyl group} + 68.10 \times A) \qquad (3)$$

Here, "A" represents (concentration of terminal carboxyl group-concentration of terminal amino group).

(3) Crystallization Degree and Melting Point of Polyamide Resin Composition

A differential scanning calorimeter (manufactured by Shimadzu Corporation, product name: DSC-60) was used to perform differential scanning calorimetry (DSC) at a temperature increase rate of 10° C./min under a nitrogen stream, and a crystallization degree was calculated by equation (1) below from a peak temperature attributed to crystallization during measurement (crystallization peak temperature) and an exothermic peak (heat quantity A), and a peak temperature attributed to melting (melting point) and an endothermic peak (heat quantity B). It should be noted that a crystal melting heat (heat quantity C) was defined as 151 J/g, and the heat quantity A and heat quantity B are represented as absolute values.

$$\text{Crystallization degree} = ((\text{heat quantity } B) - (\text{heat quantity } A)/\text{heat quantity } C \times 100(\%) \qquad (1)$$

(4) Semi-Crystallization Time at Cooling of Polyamide Resin Composition

A time until a half of crystallization proceeded when a product obtained by melting five layers of films each being formed of a polyamide resin composition and having a thickness of 100 μm in a hot-air environment at 260° C. for three minutes by a depolarization intensity method was allowed to crystallize in an oil bath at 160° C. was determined using an apparatus for measurement of semi-crystallization time (manufactured by Kotaki Seisakusho Ltd., product name: MK701) as a semi-crystallization time.

(5) Fuel Permeation Coefficient of Polyamide Resin Composition Film and Fuel Permeation Rate of Container (Bottle)

A polyamide resin composition obtained by blending a crystallization promoter in a polyamide resin was charged to a twin screw extruder with a diameter of 15 mm to prepare a film with a thickness of 100 μm at a predetermined temperature of 240 to 260° C. A cylindrical stainless-steel container for fuel permeation test was filled with 10 ml of a fuel (isooctane/toluene/ethanol=50/50/12 vol %), and on the container, a product obtained by cutting the resultant film into a circle with a diameter of 55 mm was sandwiched between two packings. A cap with a hollow core was screwed thereon tightly. The container for fuel permeation test was turned upside-down such that the fuel was brought into contact with the film, and the container was allowed to stand in an explosion-proof thermo-hygrostat adjusted to 40° C./65% RH. The weight of the container filled with the fuel was measured arbitrarily, and a fuel permeation rate was calculated from a weight variation. A time-course test was performed for 500 hours, and a fuel permeation coefficient (g·mm/(m$^2$·day)) was determined by multiplying an accumulated fuel permeation rate by the thickness of the film.

Meanwhile, in the same manner as above, the produced direct blow bottle was filled with 100 ml of the fuel, and the opening of the bottle was heat-sealed with a film formed of polyethylene and aluminum using an iron, followed by determination of a fuel permeation rate (g/(bottle·day)) after the 500-hour time-course test.

(6) Strength Retention (Ethanol Resistance) of Polyamide Resin Composition Film

A polyamide resin film with a width of 10 mm, a length of 100 mm, and a thickness of 100 μm was immersed in ethanol at 23° C. for one week and then washed with distilled water. After that, humidity conditioning was performed for one week in an environment of 23° C. and 50% RH, and then a tensile test was performed using a tensile tester (manufactured by Toyo Seiki Seisaku-sho, Ltd., Strograph V1-C) at a tensile rate of 50 mm/min. Strength retention (%) was calculated from the resultant tensile rupture strength and tensile rupture strength in the case where the film was not immersed in ethanol, and used as an index of ethanol resistance.

Example 101

4.70 mol of adipic acid (AA) and 0.30 mol of purified isophthalic acid (PIA, manufactured by A.G. International Chemical Co., Ltd.) were weighed and charged to a 3-L reaction can with a jacket equipped with a stirrer, a dephlegmator, a cooler, a drip tank, and a nitrogen gas-introducing tube, and nitrogen substitution was performed sufficiently. Further, the mixture was mixed with stirring under a small amount of a nitrogen stream at 160° C. to melt into a slurry. 4.97 mol of m-xylylenediamine (MXDA) were added dropwise thereto with stirring over 160 minutes. During the procedure, the inner temperature was raised continuously to 250° C. Distillate water produced by the dropwise addition of m-xylylenediamine was discharged from the system through the dephlegmator and cooler. After completion of the dropwise addition of m-xylylenediamine, the inner temperature was raised to 260° C., and the slurry was further allowed to react for 1 hour. The resultant polymer was taken out from a nozzle on the bottom of the reaction can as strands, cooled with water, and then cut into pellets, to thereby obtain a polyamide resin (A1) having a molar ratio of (adipic acid):(purified isophthalic acid)=94:6. The resultant polyamide rein (A1) was vacuum-dried at 140° C. for 6 hours, and then the relative viscosity and reaction molar ratio were measured.

Meanwhile, a polyamide resin composition obtained by dry-blending 1 part by mass of powdered talc (crystallization promoter, manufactured by Matsumura Sangyo Co., Ltd., product name DG-5000) in 100 parts by mass of the polyamide resin (A1) was used to produce a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 1 shows the results.

Further, three mono screw extruders each with a diameter of 40 mm capable of extruding up to three kinds of five layers of parisons and a direct blow bottle producing machine formed of a cylindrical die and a 200-ml container mold were used to produce a direct blow bottle including three kinds of three layers, i.e., from the outer layer, a layer formed of high density polyethylene (HDPE) (manufactured by Japan Polyethylene Corporation, product name: HB332R), a layer formed of an adhesive (manufactured by Mitsubishi Chemical Corporation, product name: Modic L502), and a fuel barrier layer as the inner most layer, i.e., a layer formed of a polyamide resin composition obtained by dry-blending 1 part by mass of powdered talc (crystallization promoter, manufactured by Matsumura Sangyo Co., Ltd., product name: DG-5000) in 100 parts by mass of the polyamide resin (A1). The resultant direct blow bottle had a volume of 200 ml and a total thickness of about 1.2 mm, and the fuel barrier layer had a thickness of about 0.3 mm. In this case, the temperature of the mold was 30° C., and the retention time in the mold was 7 seconds (36.8% of the semi-crystallization time at cooling). The fuel permeation rate of the resultant bottle was measured. Table 1 shows the results.

Example 102

A film was prepared in the same manner as in Example 101 except that a polyamide resin composition obtained by dry-blending 0.4 parts by mass of a bis(N-propylbenzylidene) sorbitol-based organic crystallization nucleating agent (manufactured by Milliken, product name: Millad NX8000) in 100 parts by mass of the polyamide resin (A1) was used. The crystallization peak temperature, melting point, heat quantity A, heat quantity B, crystallization degree, semi-crystallization time at cooling, fuel permeation coefficient, and strength retention of the film were determined. Table 1 shows the results.

Further, a direct blow bottle was produced in the same manner as in Example 101 except that the polyamide resin composition was used, and the retention time in the mold was changed to 25 seconds (33.3% of the semi-crystallization time at cooling), and the fuel permeation rate was measured. Table 1 shows the results.

Example 103

A polyamide resin (A2) having a molar ratio of (adipic acid):(purified isophthalic acid)=90:10 was obtained in the same manner as in Example 101 except that the amount of adipic acid (AA) charged was changed to 4.50 mol, and the amount of purified isophthalic acid (PIA, manufactured by A.G. International Chemical Co., Ltd.) charged was changed to 0.50 mol. The resultant polyamide rein (A2) was vacuum-dried at 140° C. for 6 hours, and then the relative viscosity and reaction molar ratio were measured.

In addition, a film was prepared in the same manner as in Example 101 except that the polyamide resin (A1) was changed to the polyamide resin (A2). The crystallization peak temperature, melting point, heat quantity A, heat quantity B, crystallization degree, semi-crystallization time at cooling, fuel permeation coefficient, and strength retention of the film were determined. Table 1 shows the results.

Further, a direct blow bottle was produced in the same manner as in Example 101 except that the polyamide resin (A1) was changed to the polyamide resin (A2), and the retention time in the mold was changed to 8 seconds (38.1% of the semi-crystallization time at cooling), and the fuel permeation rate was measured. Table 1 shows the results.

Example 104

A film was prepared in the same manner as in Example 102 except that the amount of the organic crystallization nucleating agent added was changed to 0.1 parts by mass. The crystallization peak temperature, melting point, heat quantity A, heat quantity B, crystallization degree, semi-crystallization time at cooling, fuel permeation coefficient, and strength retention of the film were determined. Table 1 shows the results.

Further, a direct blow bottle was produced in the same manner as in Example 102 except that the polyamide resin composition was used, and the fuel permeation rate was measured. Table 1 shows the results.

Example 105

A film was prepared in the same manner as in Example 102 except that the amount of the organic crystallization nucleating agent added was changed to 1.8 parts by mass. The crystallization peak temperature, melting point, heat quantity A, heat quantity B, crystallization degree, semi-crystallization time at cooling, fuel permeation coefficient, and strength retention of the film were determined. Table 1 shows the results.

Further, a direct blow bottle was produced in the same manner as in Example 102 except that the polyamide resin composition was used, and the fuel permeation rate was measured. Table 1 shows the results.

Example 106

A direct blow bottle was produced in the same manner as in Example 102 except that the temperature of the mold was changed to 5° C., and the fuel permeation rate was measured. Table 1 shows the results.

Example 107

A direct blow bottle was produced in the same manner as in Example 102 except that the temperature of the mold was changed to 55° C., and the fuel permeation rate was measured. Table 1 shows the results.

Example 201

A polyamide resin (B1) having a molar ratio of (adipic acid):(purified terephthalic acid)=94:6 was obtained in the same manner as in Example 101 except that the purified isophthalic acid was changed to purified terephthalic acid (PTA, manufactured by Mitsubishi Gas Chemical Company, Inc.). The resultant polyamide rein (B1) was vacuum-dried at 140° C. for 6 hours, and then the relative viscosity and reaction molar ratio were measured.

In addition, a film was prepared in the same manner as in Example 101 except that the polyamide resin (A1) was changed to the polyamide resin (B1). The crystallization peak temperature, melting point, heat quantity A, heat quantity B, crystallization degree, semi-crystallization time at cooling, fuel permeation coefficient, and strength retention of the film were determined. Table 2 shows the results.

Further, a direct blow bottle was produced in the same manner as in Example 101 except that the polyamide resin (A1) was changed to the polyamide resin (B1), and the retention time in the mold was changed to 8 seconds (32.0% of the semi-crystallization time at cooling), and the fuel permeation rate was measured. Table 2 shows the results.

Example 202

A film was prepared in the same manner as in Example 201 except that a polyamide resin composition obtained by dry-blending 0.4 parts by mass of an organic crystallization nucleating agent (manufactured by Milliken, product name: Millad NX8000) in 100 parts by mass of the polyamide resin (B1) was used. The crystallization peak temperature, melting point, heat quantity A, heat quantity B, crystallization degree, semi-crystallization time at cooling, fuel permeation coefficient, and strength retention of the film were determined. Table 2 shows the results.

Further, a direct blow bottle was produced in the same manner as in Example 201 except that the polyamide resin composition was used, and the retention time in the mold was changed to 30 seconds (31.6% of the semi-crystallization time at cooling), and the fuel permeation rate was measured. Table 2 shows the results.

Example 203

A polyamide resin (B2) having a molar ratio of (adipic acid):(purified terephthalic acid)=90:10 was obtained in the same manner as in Example 201 except that the amount of adipic acid (AA) charged was changed to 4.50 mol, and the amount of purified terephthalic acid charged (PTA, manufactured by Mitsubishi Gas Chemical Company, Inc.) was changed to 0.50 mol. The resultant polyamide rein (B2) was vacuum-dried at 140° C. for 6 hours, and then the relative viscosity and reaction molar ratio were measured.

In addition, a film was prepared in the same manner as in Example 201 except that the polyamide resin (B1) was changed to the polyamide resin (B2). The crystallization peak temperature, melting point, heat quantity A, heat quantity B, crystallization degree, semi-crystallization time at cooling, fuel permeation coefficient, and strength retention of the film were determined. Table 2 shows the results.

Further, a direct blow bottle was produced in the same manner as in Example 201 except that the polyamide resin (B1) was changed to the polyamide resin (B2), and the retention time in the mold was changed to 15 seconds (37.5% of the semi-crystallization time at cooling), and the fuel permeation rate was measured. Table 2 shows the results.

Example 301

A polyamide resin (C1) having a molar ratio of (adipic acid):(2,6-naphthalenedicarboxylic acid)=94:6 was obtained in the same manner as in Example 101 except that the purified isophthalic acid was changed to 2,6-naphthalenedicarboxylic acid (NDCA). The resultant polyamide rein (C1) was vacuum-dried at 140° C. for 6 hours, and then the relative viscosity and reaction molar ratio were measured.

In addition, a film was prepared in the same manner as in Example 101 except that the polyamide resin (A1) was changed to the polyamide resin (C1). The crystallization peak temperature, melting point, heat quantity A, heat quantity B, crystallization degree, semi-crystallization time at cooling, fuel permeation coefficient, and strength retention of the film were determined. Table 3 shows the results.

Further, a direct blow bottle was produced in the same manner as in Example 101 except that the polyamide resin (A1) was changed to the polyamide resin (C1), and the retention time in the mold was changed to 6 seconds (37.5% of the semi-crystallization time at cooling), and the fuel permeation rate was measured. Table 3 shows the results.

Example 302

A film was prepared in the same manner as in Example 301 except that a polyamide resin composition obtained by dry-blending 0.4 parts by mass of an organic crystallization nucleating agent (manufactured by Milliken, product name: Millad NX8000) in 100 parts by mass of the polyamide resin (C1) was used. The crystallization peak temperature, melting point, heat quantity A, heat quantity B, crystallization degree, semi-crystallization time at cooling, fuel permeation coefficient, and strength retention of the film were determined. Table 3 shows the results.

Further, a direct blow bottle was produced in the same manner as in Example 301 except that the polyamide resin composition was used, and the retention time in the mold was changed to 20 seconds (31.3% of the semi-crystallization time at cooling), and the fuel permeation rate was measured. Table 3 shows the results.

Example 303

A polyamide resin (C2) having a molar ratio of (adipic acid):(2,6-naphthalenedicarboxylic acid)=90:10 was obtained in the same manner as in Example 301 except that the amount of adipic acid (AA) charged was changed to 4.50 mol, and the amount of 2,6-naphthalenedicarboxylic acid (NDCA) was changed to 0.50 mol. The resultant polyamide rein (C2) was vacuum-dried at 140° C. for 6 hours, and then the relative viscosity and reaction molar ratio were measured.

In addition, a film was prepared in the same manner as in Example 301 except that the polyamide resin (C1) was changed to the polyamide resin (C2). The crystallization peak temperature, melting point, heat quantity A, heat quantity B, crystallization degree, semi-crystallization time at cooling, fuel permeation coefficient, and strength retention of the film were determined. Table 3 shows the results.

Further, a direct blow bottle was produced in the same manner as in Example 301 except that the polyamide resin (C1) was changed to the polyamide resin (C2), and the retention time in the mold was changed to 20 seconds (35.7% of the semi-crystallization time at cooling), and the fuel permeation rate was measured. Table 3 shows the results.

Comparative Example 101

A polyamide resin (D1), i.e., polyamide MXD6, was obtained in the same manner as in Example 101 except that 4.70 mol of adipic acid (AA) and 4.67 mol of m-xylylenediamine (MXDA) were used as raw materials. The resultant polyamide rein (D1) was vacuum-dried at 140° C. for 6 hours, and then the relative viscosity and reaction molar ratio were measured.

In addition, the polyamide resin (D1) (no addition of a crystallization promoter) was used to prepare a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 4 shows the results.

Further, a direct blow bottle was produced in the same manner as in Example 101 except that the retention time in the mold was changed to 15 seconds (41.7% of the semi-crystallization time at cooling), and the above-mentioned polyamide resin composition as the material for the fuel barrier layer was changed to the polyamide resin (D1) (no addition of a crystallization promoter), and the fuel permeation rate was measured. Table 4 shows the results.

Comparative Example 102

A direct blow bottle was produced in the same manner as in Comparative Example 101 except that the retention time in the mold was changed to 6 seconds (16.7% of the semi-crystallization time at cooling), and the fuel permeation rate was measured. Table 4 shows the results.

Comparative Example 103

A film was prepared in the same manner as in Comparative Example 101 except that a polyamide resin composition obtained by dry-blending 1 part by mass of powdered talc (crystallization promoter, manufactured by Matsumura Sangyo Co., Ltd., product name DG-5000) in 100 parts by mass of the polyamide resin (D1) was used. The crystallization peak temperature, melting point, heat quantity A, heat quantity B, crystallization degree, semi-crystallization time at cooling, fuel permeation coefficient, and strength retention of the film were determined. Table 4 shows the results.

Further, a direct blow bottle was produced in the same manner as in Comparative Example 101 except that the polyamide resin composition was used, and the retention time in the mold was changed to 5 seconds (55.6% of the semi-crystallization time at cooling), and the fuel permeation rate was measured. Table 4 shows the results.

Comparative Example 104

A direct blow bottle was produced in the same manner as in Comparative Example 103 except that the retention time in the mold was changed to 2 seconds (22.2% of the semi-crystallization time at cooling), and the fuel permeation rate was measured. Table 4 shows the results.

Comparative Example 105

A polyamide resin (A4) having a molar ratio of (adipic acid):(purified isophthalic acid)=85:15 was obtained in the same manner as in Example 101 except that the amount of adipic acid (AA) charged was changed to 4.25 mol, and the amount of purified isophthalic acid (PIA, manufactured by A.G. International Chemical Co., Ltd.) charged was changed to 0.75 mol. The resultant polyamide rein (A4) was vacuum-dried at 140° C. for 6 hours, and then the relative viscosity and reaction molar ratio were measured.

In addition, the polyamide resin (A4) (no addition of a crystallization promoter) was used to prepare a film with a thickness of 100 μm using the twin screw extruder. The crystallization peak temperature, melting point, heat quantity A, heat quantity B, crystallization degree, semi-crystallization time at cooling, fuel permeation coefficient, and strength retention of the film were determined. Table 5 shows the results.

Further, a direct blow bottle was produced in the same manner as in Example 101 except that the retention time in the mold was changed to 200 seconds (31.3% of the semi-crystallization time at cooling), and the above-mentioned polyamide resin composition as the material for the fuel barrier layer was changed to the polyamide resin (A4) (no addition of a crystallization promoter), and the fuel permeation rate was measured. Table 5 shows the results.

Comparative Example 106

A direct blow bottle was produced in the same manner as in Comparative Example 105 except that the retention time in the mold was changed to 150 seconds (23.4% of the semi-crystallization time at cooling), and the fuel permeation rate was measured. Table 5 shows the results.

Comparative Example 107

A film was prepared in the same manner as in Comparative Example 105 except that a polyamide resin composition obtained by dry-blending 1 part by mass of powdered talc (crystallization promoter, manufactured by Matsumura Sangyo Co., Ltd., product name: DG-5000) in 100 parts by mass of the polyamide resin (A4) was used. The crystallization peak temperature, melting point, heat quantity A, heat quantity B, crystallization degree, semi-crystallization time at cooling, fuel permeation coefficient, and strength retention of the film were determined. Table 5 shows the results.

Further, a direct blow bottle was produced in the same manner as in Comparative Example 105 except that the polyamide resin composition was used, and the retention time in the mold was changed to 60 seconds (37.5% of the semi-crystallization time at cooling), and the fuel permeation rate was measured. Table 5 shows the results.

Comparative Example 108

A direct blow bottle was produced in the same manner as in Comparative Example 107 except that the retention time in the mold was changed to 30 seconds (18.8% of the semi-crystallization time at cooling), and the fuel permeation rate was measured. Table 5 shows the results.

Comparative Example 205

A polyamide resin (B4) having a molar ratio of (adipic acid):(purified terephthalic acid)=85:15 was obtained in the same manner as in Example 201 except that the amount of adipic acid (AA) charged was changed to 4.25 mol, and the amount of purified terephthalic acid (PTA, manufactured by Mitsubishi Gas Chemical Company, Inc.) was changed to 0.75 mol. The resultant polyamide rein (B4) was vacuum-dried at 140° C. for 6 hours, and then the relative viscosity and reaction molar ratio were measured.

In addition, the polyamide resin (B4) (no addition of a crystallization promoter) was used to prepare a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 6 shows the results.

Further, a direct blow bottle was produced in the same manner as in Example 201 except that the retention time in the mold was changed to 650 seconds (30.1% of the semi-crystallization time at cooling), and the above-mentioned polyamide resin composition as the material for the fuel barrier layer was changed to the polyamide resin (B4) (no addition of a crystallization promoter), and the fuel permeation rate was measured. Table 6 shows the results.

Comparative Example 206

A direct blow bottle was produced in the same manner as in Comparative Example 205 except that the retention time in the mold was changed to 300 seconds (13.9% of the semi-crystallization time at cooling), and the fuel permeation rate was measured. Table 6 shows the results.

Comparative Example 207

A film was prepared in the same manner as in Comparative Example 205 except that a polyamide resin composition obtained by dry-blending 1 part by mass of powdered talc (crystallization promoter, manufactured by Matsumura Sangyo Co., Ltd., product name DG-5000) in 100 parts by mass of the polyamide resin (B4) was used. The crystallization peak temperature, melting point, heat quantity A, heat quantity B, crystallization degree, semi-crystallization time at cooling, fuel permeation coefficient, and strength retention of the film were determined. Table 6 shows the results.

Further, a direct blow bottle was produced in the same manner as in Comparative Example 205 except that the polyamide resin composition was used, and the retention time in the mold was changed to 170 seconds (31.5% of the semi-crystallization time at cooling), and the fuel permeation rate was measured. Table 6 shows the results.

Comparative Example 208

A direct blow bottle was produced in the same manner as in Comparative Example 207 except that the retention time in the mold was changed to 100 seconds (18.5% of the semi-crystallization time at cooling), and the fuel permeation rate was measured. Table 6 shows the results.

Comparative Example 305

A polyamide resin (C4) having a molar ratio of (adipic acid):(2,6-naphthalenedicarboxylic acid)=80:20 was obtained in the same manner as in Example 301 except that the amount of adipic acid (AA) was changed to 4.0 mol, and the amount of 2,6-naphthalenedicarboxylic acid (NDCA, manufactured by Mitsubishi Gas Chemical Company, Inc.) was changed to 1.0 mol. The resultant polyamide rein (C4) was vacuum-dried at 140° C. for 6 hours, and then the relative viscosity and reaction molar ratio were measured.

In addition, the polyamide resin (C4) (no addition of a crystallization promoter) was used to prepare a film with a thickness of 100 μM using a twin screw extruder. The crystallization peak temperature, melting point, heat quantity A, heat quantity B, crystallization degree, semi-crystallization time at cooling, fuel permeation coefficient, and strength retention of the film were determined. Table 7 shows the results.

Further, a direct blow bottle was produced in the same manner as in Example 301 except that the retention time in the mold was changed to 150 seconds (37.5% of the semi-crystallization time at cooling), and the above-mentioned polyamide resin composition as the material for the fuel barrier layer was changed to the polyamide resin (C4) (no addition of a crystallization promoter), and the fuel permeation rate was measured. Table 7 shows the results.

Comparative Example 306

A direct blow bottle was produced in the same manner as in Comparative Example 305 except that the retention time in the mold was changed to 100 seconds (25.0% of the semi-crystallization time at cooling), and the fuel permeation rate was measured. Table 7 shows the results.

Comparative Example 307

A film was prepared in the same manner as in Comparative Example 305 except that a polyamide resin composition obtained by dry-blending 1 part by mass of powdered talc (crystallization promoter, manufactured by Matsumura Sangyo Co., Ltd., product name DG-5000) in 100 parts by mass of the polyamide resin (C4) was used. The crystallization peak temperature, melting point, heat quantity A, heat quantity B, crystallization degree, semi-crystallization time at cooling, fuel permeation coefficient, and strength retention of the film were determined. Table 7 shows the results.

Further, a direct blow bottle was produced in the same manner as in Comparative Example 305 except that the polyamide resin composition was used, and the retention time in the mold was changed to 40 seconds (40.0% of the semi-crystallization time at cooling), and the fuel permeation rate was measured. Table 7 shows the results.

Comparative Example 308

A direct blow bottle was produced in the same manner as in Comparative Example 307 except that the retention time in the mold was changed to 20 seconds (20.0% of the semi-crystallization time at cooling), and the fuel permeation rate was measured. Table 7 shows the results.

Comparative Example 109

The polyamide resin (A1) (no addition of a crystallization promoter) was used to prepare a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 8 shows the results.

Further, a direct blow bottle was produced in the same manner as in Example 101 except that the retention time in the mold was changed to 25 seconds (32.9% of the semi-crystallization time at cooling), and the above-mentioned polyamide resin composition as the material for the fuel barrier layer was changed to the polyamide resin (A1) (no addition of a crystallization promoter), and the fuel permeation rate was measured. Table 8 shows the results.

Comparative Example 110

A direct blow bottle was produced in the same manner as in Comparative Example 109 except that the retention time in the mold was changed to 15 seconds (19.7% of the semi-crystallization time at cooling), and the fuel permeation rate was measured. Table 8 shows the results.

Comparative Example 111

A direct blow bottle was produced in the same manner as in Example 101 except that the retention time in the mold was changed to 3 seconds (15.8% of the semi-crystallization time at cooling), and the fuel permeation rate was measured. Table 8 shows the results.

Comparative Example 112

A direct blow bottle was produced in the same manner as in Example 102 except that the temperature of the mold was changed to 65° C., and the fuel permeation rate was measured. Table 8 shows the results.

Comparative Example 113

A direct blow bottle was produced in the same manner as in Example 102 except that the retention time in the mold was changed to 100 seconds (133% of the semi-crystallization time at cooling), and the temperature of the mold was changed to 65° C., and the fuel permeation rate was measured. Table 8 shows the results.

Comparative Example 209

The polyamide resin (B1) (no addition of a crystallization promoter) was used to prepare a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 9 shows the results.

Further, a direct blow bottle was produced in the same manner as in Example 201 except that the retention time in the mold was changed to 30 seconds (31.3% of the semi-crystallization time at cooling), and the above-mentioned polyamide resin composition as the material for the fuel barrier layer was changed to the polyamide resin (B1) (no addition of a crystallization promoter), and the fuel permeation rate was measured. Table 9 shows the results.

Comparative Example 210

A direct blow bottle was produced in the same manner as in Comparative Example 209 except that the retention time in the mold was changed to 10 seconds (10.4% of the semi-crystallization time at cooling), and the fuel permeation rate was measured. Table 9 shows the results.

Comparative Example 211

A direct blow bottle was produced in the same manner as in Example 201 except that the retention time in the mold was changed to 5 seconds (20.0% of the semi-crystallization time at cooling), and the fuel permeation rate was measured. Table 9 shows the results.

Comparative Example 309

The polyamide resin (C1) (no addition of a crystallization promoter) was used to prepare a film with a thickness of 100 μm using a twin screw extruder. The crystallization peak temperature, melting point, heat quantity A, heat quantity B, crystallization degree, semi-crystallization time at cooling, fuel permeation coefficient, and strength retention of the film were determined. Table 10 shows the results.

Further, a direct blow bottle was produced in the same manner as in Example 301 except that the retention time in the mold was changed to 20 seconds (31.3% of the semi-crystallization time at cooling), and the above-mentioned polyamide resin composition as the material for the fuel barrier layer was changed to the polyamide resin (C1) (no addition of a crystallization promoter), and the fuel permeation rate was measured. Table 10 shows the results.

Comparative Example 310

A direct blow bottle was produced in the same manner as in Comparative Example 309 except that the retention time in the mold was changed to 15 seconds (23.4% of the semi-crystallization time at cooling), and the fuel permeation rate was measured. Table 10 shows the results.

Comparative Example 311

A direct blow bottle was produced in the same manner as in Example 301 except that the retention time in the mold was changed to 3 seconds (18.8% of the semi-crystallization time at cooling), and the fuel permeation rate was measured. Table 10 shows the results.

[Table 1]

TABLE 1

| Polyamide resin composition | | | Example 101 | Example 102 | Example 103 | Example 104 | Example 105 | Example 106 | Example 107 |
|---|---|---|---|---|---|---|---|---|---|
| Composition ratio (molar ratio) | Amine | MXDA | 100 | 100 | 100 | 100 | 100 | 100 | 100 |
| | Carboxylic acid | AA | 94 | 94 | 90 | 94 | 94 | 94 | 94 |
| | | PIA | 6 | 6 | 10 | 6 | 6 | 6 | 6 |
| | Crystallization promoter | | DG-5000 1 part by mass | NX8000 0.4 parts by mass | DG-5000 1 part by mass | NX8000 0.1 parts by mass | NX8000 1.8 parts by mass | NX8000 0.4 parts by mass | NX8000 0.4 parts by mass |
| Pellet | Relative viscosity | | 2.4 | 2.4 | 2.4 | 2.4 | 2.4 | 2.4 | 2.4 |
| | Reaction molar ratio | | 0.994 | 0.994 | 0.994 | 0.994 | 0.994 | 0.994 | 0.994 |
| Film | Crystallization degree (%) | | 11 | 13 | 5 | 13 | 15 | 13 | 13 |
| | Crystallization peak temperature (° C.) | | 147 | 158 | 157 | 158 | 158 | 158 | 158 |
| | Melting point (° C.) | | 229 | 229 | 224 | 229 | 229 | 229 | 229 |
| | Heat quantity A (J/g) | | 35 | 32 | 35 | 33 | 32 | 32 | 32 |
| | Heat quantity B (J/g) | | −52 | −52 | −43 | −52 | −55 | −52 | −52 |
| | Semi-crystallization time at cooling (sec) | | 19 | 75 | 21 | 75 | 75 | 75 | 75 |
| | Fuel permeation coefficient (g · mm/(m$^2$ · day)) | | 0.4 | 0.3 | 0.5 | 0.4 | 0.3 | 0.3 | 0.3 |
| | Strength retention (%) | | 97 | 97 | 92 | 96 | 97 | 97 | 97 |
| Blow bottle | Mold temperature (° C.) | | 30 | 30 | 30 | 30 | 30 | 5 | 55 |
| | Retention time in mold (sec) | | 7 | 25 | 8 | 25 | 25 | 25 | 25 |
| | Percentage with respect to semi-crystallization time at cooling | | 36.8% | 33.3% | 38.1% | 33.3% | 33.3% | 33.3% | 33.3% |
| | Fuel permeation rate (g/(bottle · day)) | | 1.4 | 1.4 | 1.8 | 1.4 | 1.4 | 1.4 | 1.4 |

TABLE 2

| Polyamide resin composition | | | Example 201 | Example 202 | Example 203 |
|---|---|---|---|---|---|
| Composition ratio (molar ratio) | Amine | MXDA | 100 | 100 | 100 |
| | Carboxylic acid | AA | 94 | 94 | 90 |
| | | PTA | 6 | 6 | 10 |
| | Crystallization promoter | | DG-5000 1 part by mass | NX8000 0.4 parts by mass | DG-5000 1 part by mass |
| Pellet | Relative viscosity | | 2.4 | 2.4 | 2.4 |
| | Reaction molar ratio | | 0.994 | 0.994 | 0.994 |
| Film | Crystallization degree (%) | | 9 | 9 | 6 |
| | Crystallization peak temperature (° C.) | | 145 | 157 | 154 |
| | Melting point (° C.) | | 233 | 233 | 229 |
| | Heat quantity A (J/g) | | 31 | 31 | 35 |
| | Heat quantity B (J/g) | | −45 | −45 | −44 |
| | Semi-crystallization time at cooling (sec) | | 25 | 95 | 40 |
| | Fuel permeation coefficient (g · mm/(m$^2$ · day)) | | 0.5 | 0.5 | 0.6 |
| | Strength retention (%) | | 95 | 95 | 93 |
| Blow bottle | Mold temperature (° C.) | | 30 | 30 | 30 |
| | Retention time in mold (sec) | | 8 | 30 | 15 |
| | Percentage with respect to semi-crystallization time at cooling | | 32.0% | 31.6% | 37.5% |
| | Fuel permeation rate (g/(bottle · day)) | | 1.6 | 1.6 | 1.8 |

TABLE 3

| Polyamide resin composition | | | Example 301 | Example 302 | Example 303 |
|---|---|---|---|---|---|
| Composition ratio (molar ratio) | Amine | MXDA | 100 | 100 | 100 |
| | Carboxylic acid | AA | 94 | 94 | 90 |
| | | NDCA | 6 | 6 | 10 |
| | Crystallization promoter | | DG-5000 1 part by mass | NX8000 0.4 parts by mass | DG-5000 1 part by mass |
| Pellet | Relative viscosity | | 2.4 | 2.4 | 2.4 |
| | Reaction molar ratio | | 0.994 | 0.994 | 0.994 |
| Film | Crystallization degree (%) | | 12 | 11 | 8 |
| | Crystallization peak temperature (° C.) | | 140 | 151 | 157 |
| | Melting point (° C.) | | 230 | 230 | 222 |
| | Heat quantity A (J/g) | | 32 | 31 | 38 |
| | Heat quantity B (J/g) | | −50 | −48 | −50 |
| | Semi-crystallization time at cooling (sec) | | 16 | 64 | 56 |
| | Fuel permeation coefficient (g · mm/(m² · day)) | | 0.5 | 0.5 | 0.7 |
| | Strength retention (%) | | 95 | 94 | 92 |
| Blow bottle | Mold temperature (° C.) | | 30 | 30 | 30 |
| | Retention time in mold (sec) | | 6 | 20 | 20 |
| | Percentage with respect to semi-crystallization time at cooling | | 37.5% | 31.3% | 35.7% |
| | Fuel permeation rate (g/(bottle · day)) | | 1.5 | 1.6 | 1.8 |

TABLE 4

| Polyamide resin composition | | | Comparative Example 101 | Comparative Example 102 | Comparative Example 103 | Comparative Example 104 |
|---|---|---|---|---|---|---|
| Composition ratio (molar ratio) | Amine | MXDA | 100 | 100 | 100 | 100 |
| | Carboxylic acid | AA | 100 | 100 | 100 | 100 |
| | Crystallization promoter | | — | — | DG-5000 1 part by mass | DG-5000 1 part by mass |
| Pellet | Relative viscosity | | 2.4 | 2.4 | 2.4 | 2.4 |
| | Reaction molar ratio | | 0.994 | 0.994 | 0.994 | 0.994 |
| Film | Crystallization degree (%) | | 13 | 13 | 17 | 17 |
| | Crystallization peak temperature (° C.) | | 139 | 139 | 125 | 125 |
| | Melting point (° C.) | | 237 | 237 | 237 | 237 |
| | Heat quantity A (J/g) | | 37 | 37 | 31 | 31 |
| | Heat quantity B (J/g) | | −57 | −57 | −57 | −57 |
| | Semi-crystallization time at cooling (sec) | | 36 | 36 | 9 | 9 |
| | Fuel permeation coefficient (g · mm/(m² · day)) | | 0.9 | 0.9 | 0.8 | 0.8 |
| | Strength retention (%) | | 82 | 82 | 85 | 85 |
| Blow bottle | Mold temperature (° C.) | | 30 | 30 | 30 | 30 |
| | Retention time in mold (sec) | | 15 | 6 | 5 | 2 |
| | Percentage with respect to semi-crystallization time at cooling | | 41.7% | 16.7% | 55.6% | 22.2% |
| | Fuel permeation rate (g/(bottle · day)) | | 3.0 | 3.2 | 2.7 | 2.9 |

TABLE 5

| Polyamide resin composition | | | Comparative Example 105 | Comparative Example 106 | Comparative Example 107 | Comparative Example 108 |
|---|---|---|---|---|---|---|
| Composition ratio (molar ratio) | Amine | MXDA | 100 | 100 | 100 | 100 |
| | Carboxylic acid | AA | 85 | 85 | 85 | 85 |
| | | PIA | 15 | 15 | 15 | 15 |
| | Crystallization promoter | | — | — | DG-5000 1 part by mass | DG-5000 1 part by mass |
| Pellet | Relative viscosity | | 2.4 | 2.4 | 2.4 | 2.4 |
| | Reaction molar ratio | | 0.994 | 0.994 | 0.994 | 0.994 |
| Film | Crystallization degree (%) | | 2 | 2 | 3 | 3 |
| | Crystallization peak temperature (° C.) | | 172 | 172 | 163 | 163 |
| | Melting point (° C.) | | 214 | 214 | 214 | 214 |
| | Heat quantity A (J/g) | | 38 | 38 | 37 | 37 |
| | Heat quantity B (J/g) | | −41 | −41 | −42 | −42 |
| | Semi-crystallization time at cooling (sec) | | 640 | 640 | 160 | 160 |

TABLE 5-continued

|  | Polyamide resin composition | Comparative Example 105 | Comparative Example 106 | Comparative Example 107 | Comparative Example 108 |
|---|---|---|---|---|---|
| Blow bottle | Fuel permeation coefficient (g · mm/(m² · day)) | 1.2 | 1.2 | 1.1 | 1.1 |
|  | Strength retention (%) | 81 | 81 | 83 | 83 |
|  | Mold temperature (° C.) | 30 | 30 | 30 | 30 |
|  | Retention time in mold (sec) | 200 | 150 | 60 | 30 |
|  | Percentage with respect to semi-crystallization time at cooling | 31.3% | 23.4% | 37.5% | 18.8% |
|  | Fuel permeation rate (g/(bottle · day)) | 4.0 | 4.0 | 3.7 | 4.0 |

TABLE 6

|  | Polyamide resin composition |  | Comparative Example 205 | Comparative Example 206 | Comparative Example 207 | Comparative Example 208 |
|---|---|---|---|---|---|---|
| Composition ratio (molar ratio) | Amine | MXDA | 100 | 100 | 100 | 100 |
|  | Carboxylic acid | AA | 85 | 85 | 85 | 85 |
|  |  | PTA | 15 | 15 | 15 | 15 |
|  | Crystallization promoter |  | — | — | DG-5000 1 part by mass | DG-5000 1 part by mass |
| Pellet | Relative viscosity |  | 2.2 | 2.2 | 2.2 | 2.2 |
|  | Reaction molar ratio |  | 0.993 | 0.993 | 0.993 | 0.993 |
| Film | Crystallization degree (%) |  | 0.5 | 0.5 | 1 | 1 |
|  | Crystallization peak temperature (° C.) |  | 176 | 176 | 169 | 169 |
|  | Melting point (° C.) |  | 218 | 218 | 218 | 218 |
|  | Heat quantity A (J/g) |  | 37 | 37 | 37 | 37 |
|  | Heat quantity B (J/g) |  | −38 | −38 | −39 | −39 |
|  | Semi-crystallization time at cooling (sec) |  | 2,160 | 2,160 | 540 | 540 |
| Blow bottle | Fuel permeation coefficient (g · mm/(m² · day)) |  | 1.2 | 1.2 | 1.2 | 1.2 |
|  | Strength retention (%) |  | 83 | 83 | 83 | 83 |
|  | Mold temperature (° C.) |  | 30 | 30 | 30 | 30 |
|  | Retention time in mold (sec) |  | 650 | 300 | 170 | 100 |
|  | Percentage with respect to semi-crystallization time at cooling |  | 30.1% | 13.9% | 31.5% | 18.5% |
|  | Fuel permeation rate (g/(bottle · day)) |  | 4.0 | 4.0 | 4.0 | 4.0 |

TABLE 7

|  | Polyamide resin composition |  | Comparative Example 305 | Comparative Example 306 | Comparative Example 307 | Comparative Example 308 |
|---|---|---|---|---|---|---|
| Composition ratio (molar ratio) | Amine | MXDA | 100 | 100 | 100 | 100 |
|  | Carboxylic acid | AA | 80 | 80 | 80 | 80 |
|  |  | NDCA | 20 | 20 | 20 | 20 |
|  | Crystallization promoter |  | — | — | DG-5000 1 part by mass | DG-5000 1 part by mass |
| Pellet | Relative viscosity |  | 2.3 | 2.3 | 2.3 | 2.3 |
|  | Reaction molar ratio |  | 0.993 | 0.993 | 0.993 | 0.993 |
| Film | Crystallization degree (%) |  | 1 | 1 | 2 | 2 |
|  | Crystallization peak temperature (° C.) |  | 175 | 175 | 172 | 172 |
|  | Melting point (° C.) |  | 214 | 214 | 214 | 214 |
|  | Heat quantity A (J/g) |  | 13 | 13 | 12 | 12 |
|  | Heat quantity B (J/g) |  | −15 | −15 | −15 | −15 |
|  | Semi-crystallization time at cooling (sec) |  | 400 | 400 | 100 | 100 |
| Blow bottle | Fuel permeation coefficient (g · mm/(m² · day)) |  | 1.2 | 1.2 | 1.2 | 1.2 |
|  | Strength retention (%) |  | 80 | 80 | 80 | 80 |
|  | Mold temperature (° C.) |  | 30 | 30 | 30 | 30 |
|  | Retention time in mold (sec) |  | 150 | 100 | 40 | 20 |
|  | Percentage with respect to semi-crystallization time at cooling |  | 37.5% | 25.0% | 40.0% | 20.0% |
|  | Fuel permeation rate (g/(bottle · day)) |  | 3.9 | 4.0 | 3.8 | 3.7 |

TABLE 8

| Polyamide resin composition | | | Comparative Example 109 | Comparative Example 110 | Comparative Example 111 | Comparative Example 112 | Comparative Example 113 |
|---|---|---|---|---|---|---|---|
| Composition ratio (molar ratio) | Amine | MXDA | 100 | 100 | 100 | 100 | 100 |
| | Carboxylic acid | AA | 94 | 94 | 94 | 94 | 94 |
| | | PIA | 6 | 6 | 6 | 6 | 6 |
| | Crystallization promoter | | — | — | DG-5000 1 part by mass | NX8000 0.4 parts by mass | NX8000 0.4 parts by mass |
| Pellet | Relative viscosity | | 2.4 | 2.4 | 2.4 | 2.4 | 2.4 |
| | Reaction molar ratio | | 0.994 | 0.994 | 0.994 | 0.994 | 0.994 |
| Film | Crystallization degree (%) | | 6 | 6 | 11 | 13 | 13 |
| | Crystallization peak temperature (° C.) | | 163 | 163 | 147 | 158 | 158 |
| | Melting point (° C.) | | 229 | 229 | 229 | 229 | 229 |
| | Heat quantity A (J/g) | | 38 | 38 | 35 | 32 | 32 |
| | Heat quantity B (J/g) | | −47 | −47 | −52 | −52 | −52 |
| | Semi-crystallization time at cooling (sec) | | 76 | 76 | 19 | 75 | 75 |
| | Fuel permeation coefficient (g · mm/(m$^2$ · day)) | | 0.6 | 0.6 | 0.4 | 0.3 | 0.3 |
| | Strength retention (%) | | 89 | 89 | 97 | 97 | 97 |
| Blow bottle | Mold temperature (° C.) | | 30 | 30 | 30 | 65 | 65 |
| | Retention time in mold (sec) | | 25 | 15 | 3 | 25 | 100 |
| | Percentage with respect to semi-crystallization time at cooling | | 32.9% | 19.7% | 15.8% | 33.3% | 133% |
| | Fuel permeation rate (g/(bottle · day)) | | 2.2 | 2.3 | 2.0 | 2.7 | 2.4 |

TABLE 9

| Polyamide resin composition | | | Comparative Example 209 | Comparative Example 210 | Comparative Example 211 |
|---|---|---|---|---|---|
| Composition ratio (molar ratio) | Amine | MXDA | 100 | 100 | 100 |
| | Carboxylic acid | AA | 94 | 94 | 94 |
| | | PTA | 6 | 6 | 6 |
| | Crystallization promoter | | — | — | DG-5000 1 part by mass |
| Pellet | Relative viscosity | | 2.4 | 2.4 | 2.4 |
| | Reaction molar ratio | | 0.994 | 0.994 | 0.994 |
| Film | Crystallization degree (%) | | 5 | 5 | 9 |
| | Crystallization peak temperature (° C.) | | 162 | 162 | 145 |
| | Melting point (° C.) | | 233 | 233 | 233 |
| | Heat quantity A (J/g) | | 32 | 32 | 31 |
| | Heat quantity B (J/g) | | −40 | −40 | −45 |
| | Semi-crystallization time at cooling (sec) | | 96 | 96 | 25 |
| | Fuel permeation coefficient (g · mm/(m$^2$ · day)) | | 0.7 | 0.7 | 0.5 |
| | Strength retention (%) | | 88 | 88 | 95 |
| Blow bottle | Mold temperature (° C.) | | 30 | 30 | 30 |
| | Retention time in mold (sec) | | 30 | 10 | 5 |
| | Percentage with respect to semi-crystallization time at cooling | | 31.3% | 10.4% | 20.0% |
| | Fuel permeation rate (g/(bottle · day)) | | 2.2 | 2.3 | 2.1 |

TABLE 10

| Polyamide resin composition | | | Comparative Example 309 | Comparative Example 310 | Comparative Example 311 |
|---|---|---|---|---|---|
| Composition ratio (molar ratio) | Amine | MXDA | 100 | 100 | 100 |
| | Carboxylic acid | AA | 94 | 94 | 94 |
| | | NDCA | 6 | 6 | 6 |
| | Crystallization promoter | | — | — | DG-5000 1 part by mass |
| Pellet | Relative viscosity | | 2.4 | 2.4 | 2.4 |
| | Reaction molar ratio | | 0.994 | 0.994 | 0.994 |
| Film | Crystallization degree (%) | | 7 | 7 | 12 |
| | Crystallization peak temperature (° C.) | | 151 | 151 | 140 |
| | Melting point (° C.) | | 230 | 230 | 230 |
| | Heat quantity A (J/g) | | 39 | 39 | 32 |
| | Heat quantity B (J/g) | | −50 | −50 | −50 |

TABLE 10-continued

| Polyamide resin composition | | Comparative Example 309 | Comparative Example 310 | Comparative Example 311 |
|---|---|---|---|---|
| | Semi-crystallization time at cooling (sec) | 64 | 64 | 16 |
| | Fuel permeation coefficient (g · mm/(m² · day)) | 0.7 | 0.7 | 0.5 |
| | Strength retention (%) | 90 | 90 | 95 |
| Blow bottle | Mold temperature (° C.) | 30 | 30 | 30 |
| | Retention time in mold (sec) | 20 | 15 | 3 |
| | Percentage with respect to semi-crystallization time at cooling | 31.3% | 23.4% | 18.8% |
| | Fuel permeation rate (g/(bottle · day)) | 2.4 | 2.5 | 2.0 |

The results revealed that, in Examples 101 to 107, 201 to 203, and 301 to 303, polyamide resin compositions having high crystallization degrees of 5 to 15% were obtained, and films formed of the polyamide resin compositions had fuel permeation coefficients of 0.3 to 0.7 g·mm/(m²·day) and strength retention of 92 to 97% and had excellent ethanol resistance and fuel barrier property. In addition, containers using the polyamide resin compositions as fuel barrier layers were found to have excellent fuel permeation rates of 1.4 to 1.8 g/(bottle·day).

On the other hand, in Comparative Examples 101 to 104, though polyamide resin compositions having high crystallization degrees of 13 to 17% were obtained, films formed of the polyamide resin compositions were found to have inferior fuel permeation coefficients of 0.8 to 0.9 g·mm/(m²·day) and inferior strength retention of 82 to 85% because the polyamide resin compositions contained no aromatic dicarboxylic acid. In addition, containers using the polyamide resin compositions as fuel barrier layers were found to have inferior fuel permeation rates of 2.7 to 3.2 g/(bottle·day).

Meanwhile, in Comparative Examples 105 to 108, 205 to 208, and 305 to 308, polyamide resin compositions having as low crystallization degrees as 0.5 to 3% were obtained because the aromatic dicarboxylic acid contents were high, and films formed of the polyamide resin compositions were found to have inferior fuel permeation coefficients of 1.1 to 1.2 g·mm/(m²·day) and inferior strength retention of 80 to 83%. In addition, containers using the polyamide resin compositions as fuel barrier layers were found to have poor fuel permeation rates of 3.7 to 4.0 g/(bottle·day).

Further, in Comparative Examples 109, 110, 209, 210, 309, and 310, polyamide resin compositions having crystallization degrees of 5 to 7% were obtained although the compositions contained no crystallization promoter, but films formed of the polyamide resin compositions were found to have fuel permeation coefficients of 0.6 to 0.7 g·mm/(m²·day) and strength retention of 88 to 90%, which are slightly inferior to those of Examples 101 to 103, 201 to 203, and 301 to 303. In addition, containers using the polyamide resin compositions as fuel barrier layers were found to have inferior fuel permeation rates of 2.2 to 2.5 g/(bottle·day).

Moreover, in Comparative Examples 111, 211, and 311, the same polyamide resin compositions as those of Examples 101, 201, and 301, respectively, were used, but containers obtained by changing the retention times in the mold to less than 30% of the semi-crystallization time at cooling were found to have inferior fuel permeation rates of 2.0 to 2.1 g/(bottle·day).

Further, in Comparative Examples 112 and 113, the same polyamide resin composition as that of Example 102 was used, but containers obtained by changing the temperature of the mold to 65° C. were found to have inferior fuel permeation rates of 2.4 to 2.7 g/(bottle·day) although the retention time in the mold was 30% or more of the semi-crystallization time at cooling. In addition, the containers underwent considerable contraction and the like and had inferior dimensional accuracy.

INDUSTRIAL APPLICABILITY

The container produced by the method of the present invention is excellent in the ethanol resistance and fuel barrier property and can be suitably used for, for example, a fuel tube or a fuel tank around an automobile engine, or a fuel tank of a machine equipped with a small engine such as a boat, a snowmobile, or a lawn mower.

The invention claimed is:

1. A method for producing a container, the method comprising:
    inflating a material in a mold by direct blow molding, wherein the material comprises a polyamide resin composition comprising 0.01 to 2 parts by mass of a crystallization promoter and 100 parts by mass of a polyamide resin obtained by polycondensation of (i) a diamine component comprising 70 mol % or more of m-xylylenediamine and (ii) a dicarboxylic acid component comprising an α,ω-linear aliphatic dicarboxylic acid comprising 4 to 12 carbon atoms and an aromatic dicarboxylic acid at a molar ratio of 97:3 to 90:10; and
    retaining the material in the mold, which has a temperature held at a temperature of 0 to 60° C., for a time beginning immediately after the direct blow molding and lasting for 30% or more and 1,000% or less of a semi-crystallization time at cooling of the polyamide resin composition under a constant temperature of 160° C.,
    wherein a peak temperature due to crystallization during heating in differential calorimetry of the polyamide resin composition is 140 to 160° C.

2. The method of claim 1, wherein the aromatic dicarboxylic acid is at least one selected from the group consisting of isophthalic acid, terephthalic acid, and 2,6-naphthalenedicarboxylic acid.

3. The method of claim 1, further comprising forming at least one additional layer which comprises another thermoplastic resin to form a multilayer container, and the direct blow molding of the material is carried out so that the multilayer container comprises a layer comprising the material.

4. The method of claim 3, wherein the multilayer container comprises a layer comprising a second material comprising a polyolefin resin, which is different than the layer comprising the material.

5. The method of claim 3, wherein the direct blow molding of the material is carried out so that the layer comprising the material is arranged in an inner surface of the container.

6. The method of claim 1, wherein a content of the crystallization promoter is 0.1 to 1 parts by mass, based on 100 parts of the polyamide resin.

7. The method of claim 1, wherein a content of the m-xylenediamine in the diamine component is 75 mol % or more.

8. The method of claim 1, wherein a content of the m-xylenediamine in the diamine component is 85 mol % or more.

9. The method of claim 1, wherein a content of the m-xylenediamine in the diamine component is 90 mol % or more.

10. The method of claim 1, wherein the α,ω-linear aliphatic dicarboxylic acid is at least one selected from the group consisting of succinic acid, glutaric acid, pimelic acid, suberic acid, azelaic acid, adipic acid, sebacic acid, undecanedioic acid, and dodecanedioic acid.

11. The method of claim 1, wherein the α,ω-linear aliphatic dicarboxylic acid is adipic acid.

12. The method of claim 1, wherein the aromatic dicarboxylic acid is isophthalic acid.

13. The method of claim 1, wherein the aromatic dicarboxylic acid is terephthalic acid.

14. The method of claim 1, wherein the aromatic dicarboxylic acid is 2,6-naphthalenedicarboxylic acid.

15. The method of claim 1, wherein the crystallization promoter is powdered talc having a particle diameter of about 1.5 to 3.0 μm or less.

16. The method of claim 1, wherein the crystallization promoter is a bis(benzylidene)sorbitol-based crystallization nucleating agent.

17. The method of claim 1, wherein the polyamide resin composition has a relative viscosity of 1.5 to 4.2.

18. The method of claim 1, wherein the retention time in the mold is 6 to 30 seconds.

* * * * *